United States Patent
Mori et al.

(10) Patent No.: US 8,635,241 B2
(45) Date of Patent: Jan. 21, 2014

(54) METHOD OF RECOMMENDING INFORMATION, SYSTEM THEREOF, AND SERVER

(75) Inventors: Yasuhide Mori, Kawasaki (JP); Yoshio Miki, Kodaira (JP); Masahiro Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/148,966

(22) PCT Filed: Feb. 18, 2009

(86) PCT No.: PCT/JP2009/000666
§ 371 (c)(1),
(2), (4) Date: Aug. 11, 2011

(87) PCT Pub. No.: WO2010/095169
PCT Pub. Date: Aug. 26, 2010

(65) Prior Publication Data
US 2011/0314040 A1 Dec. 22, 2011

(51) Int. Cl.
*G06F 17/00* (2006.01)
(52) U.S. Cl.
USPC .......................................................... 707/767
(58) Field of Classification Search
None
See application file for complete search history.

(56) References Cited

U.S. PATENT DOCUMENTS

| | | | |
|---|---|---|---|
| 7,152,063 B2 | 12/2006 | Hoashi et al. | |
| 2008/0201287 A1 * | 8/2008 | Takeuchi | 706/46 |

FOREIGN PATENT DOCUMENTS

| | | |
|---|---|---|
| JP | 2001-142889 | 5/2001 |
| JP | 2001-256253 | 9/2001 |
| JP | 2006-146630 | 6/2006 |
| JP | 2006-235716 | 9/2006 |
| JP | 2008-210010 | 9/2008 |

OTHER PUBLICATIONS

Toshiyuki Masui, Interfacial Street Corner (No. 93) Contributed to (Bookshelves Computation), Unix Magazine 2005, vol. 20, No. 12.
JP Office Action for JP Application No. 2011-500357, dispatched on Oct. 2, 2012.

* cited by examiner

*Primary Examiner* — Belix M Ortiz Ditren
(74) *Attorney, Agent, or Firm* — Antonelli, Terry, Stout & Kraus, LLP.

(57) ABSTRACT

Provided is an information recommendation system capable of recommending an unexpected item which a user is interested in but cannot assume easily. A server gives one or more times of initial recommendations of recommending information by a means of a user profile and a behavior history, and narrows down second recommended items to recommend next by using not only information relating to items having responses but also information relating to items having no response together. In narrowing down, the items are arranged by means of an item arrangement program by using the results of the initial recommendations, and it is identified depending on similarity by means of a boundary calculation program where the boundary between user's interest and no interest is positioned in all the items. Then, it is identified where items not recommended yet are positioned in user's interest/no interest the areas, and items in the vicinity of the boundary between the interest and no interest are determined as the second recommended items which are not uninterested and maximize unexpectedness.

3 Claims, 18 Drawing Sheets

| | CATEGORY | PRICE RANGE | PURCHASERS | SEASON | ... | KEYWORD 「xxx」 |
|---|---|---|---|---|---|---|
| MOVIE THEATER A | 1 | 1 | 2 | 0 | ... | 0 |
| CLOTHING STORE B | 2 | 3 | 5 | 1 | ... | 1 |
| ... | ... | ... | ... | ... | | ... |
| RESTAURANT Z | 3 | 10 | 3 | 1 | ... | 1 |

| TIME | SITE | STATE OF USER | RECOMMENDED ITEM | ... | RESPONSE |
|---|---|---|---|---|---|
| 10:23:30 | MOVIE THEATER A | STAYING | COUPON A | ... | 1 |
| 12:15:00 | CLOTHING STORE B | WALKING | SWEETS OF B COMPANY | ... | 0 |
| ... | ... | ... | ... | ... | ... |
| 13:45:00 | RESTAURANT Z | STAYING | C CAFE | ... | 1 |

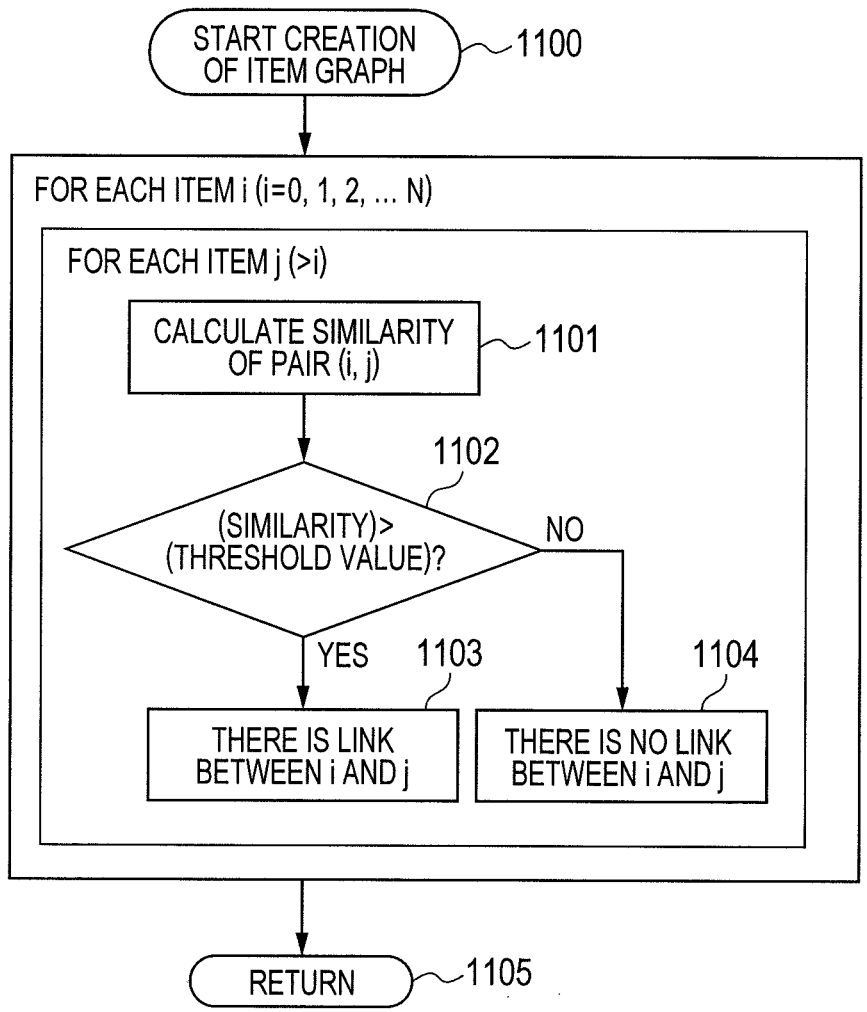

◉ : INTEREST ITEM
(FIRST RECOMMENDED)

× : NO INTEREST ITEM (FIRST RECOMMENDED)

□ : EXPANSION OF INTEREST ITEM   ∗ : EXPANSION OF NO INTEREST ITEM

0: INTEREST/NO INTEREST BOUNDARY
ITEMS (DEGREE OF DEVIATION IS 0)

FIG. 18A

| GENERATION | TEENS OR LOWER | TWENTIES | THIRTIES | ... | SIXTIES OR HIGHER |
|---|---|---|---|---|---|
| DIGITALIZATION | (1,0,0,0,0,0) | (0,1,0,0,0,0) | (0,0,1,0,0,0) | ... | (0,0,1,0,0,0) |

| WALKING DISTANCE (km) | a |
|---|---|
| DIGITALIZATION | a (DIRECT DIGITALIZATION OF DISTANCE) |

| PERSONAL RELATION | WIFE | HUSBAND | LOVER | ... | SINGLE |
|---|---|---|---|---|---|
| DIGITALIZATION | (1,0,0,0,0,0) | (2,0,0,0,0,0) | (0,1,0,0,0,0) | ... | (0,0,0,0,0,0) |

FIG. 18B

|  | PROFILE | COMPANION | WALKING DISTANCE | ESTIMATED DIETARY INTAKE | ... | SITE HISTORY |
|---|---|---|---|---|---|---|
| CONTEXT A | TWENTIES, MALE | LOVER | 100m | 2kcal | ... | CLOTHING |
| CONTEXT B | FIFTIES, FEMALE | SPOUSE | 10km | 300kcal | ... | MOVIE |
| CONTEXT C | TEENS, FEMALE | FRIEND | 1km | 30kcal | ... | GENERAL SHOP |
| ... | ... | ... | ... | ... | ... | ... |
| CONTEXT Z | TEENS, MALE | SINGLE | 3km | 100kcal | ... | EATERY |

FIG. 18C

|  | CATEGORY | PRICE RANGE | PURCHASERS | SEASON | ... | KEYWORD 「xxx」 |
|---|---|---|---|---|---|---|
| CONTEXT A | (1.0, 2.0, ...,1.0) | (2.0, 3.0, ...,4.0) | (1.0, 1.0, ...,1.0) | (1.0, 0.0, ...,1.0) | ... | (1.0, 1.0, ...,1.0) |
| CONTEXT B | (3.0, 2.0, ...,1.0) | (1.0, 2.0, ...,1.0) | (1.0, 2.0, ...,1.0) | (1.0, 0.0, ...,1.0) | ... | (0.0, 2.0, ...,0.0) |
| ... | ... | ... | ... | ... | ... | ... |
| CONTEXT Z | (2.0, 2.0, ...,1.0) | (1.0, 2.0, ...,2.0) | (1.0, 0.0, ...,0.0) | (1.0, 0.0, ...,1.0) | ... | (1.0, 2.0, ...,1.0) |

METHOD OF RECOMMENDING INFORMATION, SYSTEM THEREOF, AND SERVER

TECHNICAL FIELD

The present invention relates to a method for recommending information such as contents, in particular to a method for recommending an unexpected item which a user is interested in but not easy to conceive.

BACKGROUND ART

As a system for recommending distribution information when distributing information such as contents, a "collaborative filtering" method is conventionally known (see Non-Patent Literature 1). The collaborative filtering is a method for estimating a user profile (what type the user belongs to, and the like) from the similarity of user history in the past and determining the next recommended item.

In Patent Literature 1, a method is described in which a preferred cluster and a non-preferred cluster are created by contents which a user viewed and contents which the user did not view, and contents are recommended in order from a content similar to the preferred cluster and not similar to the non-preferred cluster.

Patent Literature 1: Japanese Patent Application Laid-Open Publication No. 2008-210010

Non-Patent Literature 1: Toshiyuki Masui, "Interface no Machikado (Street Corner of Interface) (93)—Bookshelf Calculation" Unix Magazine, Vol. 20, No. 12, 2005

SUMMARY OF INVENTION

Technical Problem

In the collaborative filtering method, in all histories of other users whose history is partially similar to that of the user, mainly, unrecommended portion is referred to and a recommended item is determined. Therefore, generally, it is difficult to recommend an unexpected item, that is, it is difficult to recommend an item which a user is interested in but not easy to conceive.

In a method described in Patent Literature 1, the degree of recommendation is determined by referring to only a cluster of a content whose degree of similarity is nearest, so if there is a cluster having a close degree of similarity, it is impossible to reflect the cluster. For example, when a content having the highest similarity and a content having the second highest similarity have preferences different from each other, or have the same preference, the degree of recommendation becomes the same. In the method, contents are recommended in order from a content considered to be most preferred, so that the recommendation order of a content far from the preferred content cannot be raised. Therefore, it is difficult to recommend an unexpected item. Further, it is not considered that a background state (physiological phenomena, human relations, and the like) occurring related to user action is reflected into contents of the recommendation.

An object of the present invention is to provide an information recommendation method and a system of the information recommendation method capable of recommending an item unexpected for a user.

Another object of the present invention is to provide an information recommendation method and a system of the information recommendation method capable of reflecting a background state occurring related to user action into contents of the recommendation.

Solution to Problem

To address the above objects, the present invention provides an information recommendation method and an information recommendation system which use a server including a processing unit and a storage unit, reflect a response of a user who receives information related to an item in a selection criterion of an item to be recommended next time, and recommends another item, wherein the processing unit collects information to which the user reacts and information to which the user does not react, compares the degree of similarity between an unrecommended item and an interest item to which the user reacts with the degree of similarity between the unrecommended item and a no interest item to which the user does not react, and determines the next recommended item to the user by using the comparison result.

The processing unit calculates a nearest interest distance and a nearest no interest distance with respect to an unrecommended item, calculates the degree of deviation from the boundary of the unrecommended item from a difference between the nearest interest distance and the nearest no interest distance, and determines the unrecommended item whose degree of deviation from the boundary is the smallest as the next recommended item.

Further, the processing unit provides an information recommendation method or the like in which the processing unit estimates a boundary of interest and no interest, which is a boundary between the interest items and the no interest items, in all items to be recommended, by expanding unrecommended items similar to the interest item and the no interest item respectively as interest items and no interest items, and determines an unrecommended item on the boundary of interest and no interest or near the boundary of interest and no interest or on the interest area side determined by the boundary of interest and no interest as the next recommended item.

Further, in the present invention, to solve the above objects, the processing unit provides an information recommendation method or the like in which the processing unit estimates attribute information (referred to as a site context) related to physiological phenomena of the user and human relations with a person accompanying the user, and reflects the site context in recommendation of an item.

As a preferred aspect of the present invention, a first recommendation is performed in which information is recommended by using action history and a fixed user profile, and items to be second recommended are narrowed down by using not only information of an item with response but also information of an item without response. When narrowing down the items, the position of the boundary of interest and no interest of the user in all items is identified by the degree of similarity by using the result of the first recommendation. As a result, a position of an unrecommended item in interest/no interest areas of the user is identified. Then, as an item which is not the no interest item and which maximizes unexpectedness, an item near the boundary of interest and no interest is determined to be a recommended item.

Further, as a more preferred aspect of the present invention, when determining a second recommended item, a second recommendation in which a site context is reflected is performed by using a function for estimating the site context, which is attribute information of a background state such as a physiological factor caused by current action and human relations with a person cooperating with the user, in addition to human action history and a fixed user profile.

Advantageous Effects of Invention

According to the present invention, it is possible to recommend an item unexpected for a user and further reflect a background state caused related to a user action in contents of the recommendation.

BRIEF DESCRIPTION OF DRAWINGS

FIG. 11A is a diagram showing a flowchart for explaining a flow of creating a graph of items according to the second embodiment.

FIG. 11B is a schematic diagram for explaining the flow of creating a graph of items according to the second embodiment.

FIG. 18A is a diagram showing an example of a parameter digitalization information table according to the third embodiment.

FIG. 18B is a diagram showing an example of a context/parameter table according to the third embodiment.

FIG. 18C is a diagram showing an example of a context/attribute weight table according to the third embodiment.

DESCRIPTION OF EMBODIMENTS

Hereinafter, embodiments for carrying out the invention will be described with reference to the drawings. First, an example of an entire system configuration in which a recommendation method and a recommendation system are implemented will be described.

Figure 1:
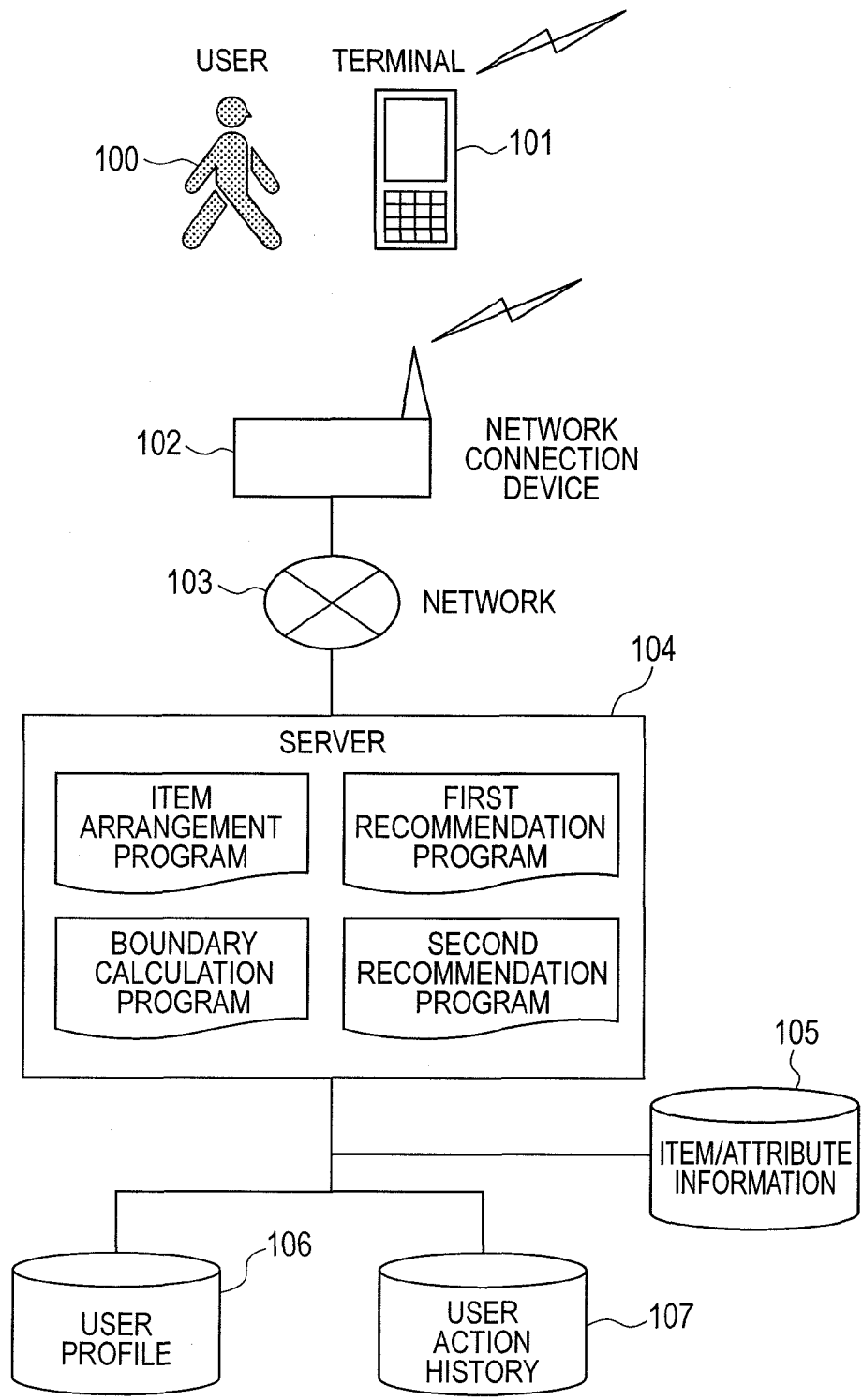
FIG. 1 is a diagram showing an example of an entire system configuration in which a recommendation system according to a first embodiment is implemented.

FIG. 1 is a diagram showing the entire system configuration in which the recommendation method and the recommendation system are implemented. In FIG. 1, a user 100 has a terminal 101 such as a mobile phone and uses the terminal 101 to access a server 104 via a network 103 through a network connection device 102 such as a wireless communication device. The server 104 contains a recommendation program, which will be described below in detail, or the like, and performs recommendation/distribution processing of contents and the like for the user 100. The server 104 has a configuration in which databases such as item/attribute information 105, a user profile 106, and a user action history 107 are externally attached to or contained in the server 104.

Figure 2:
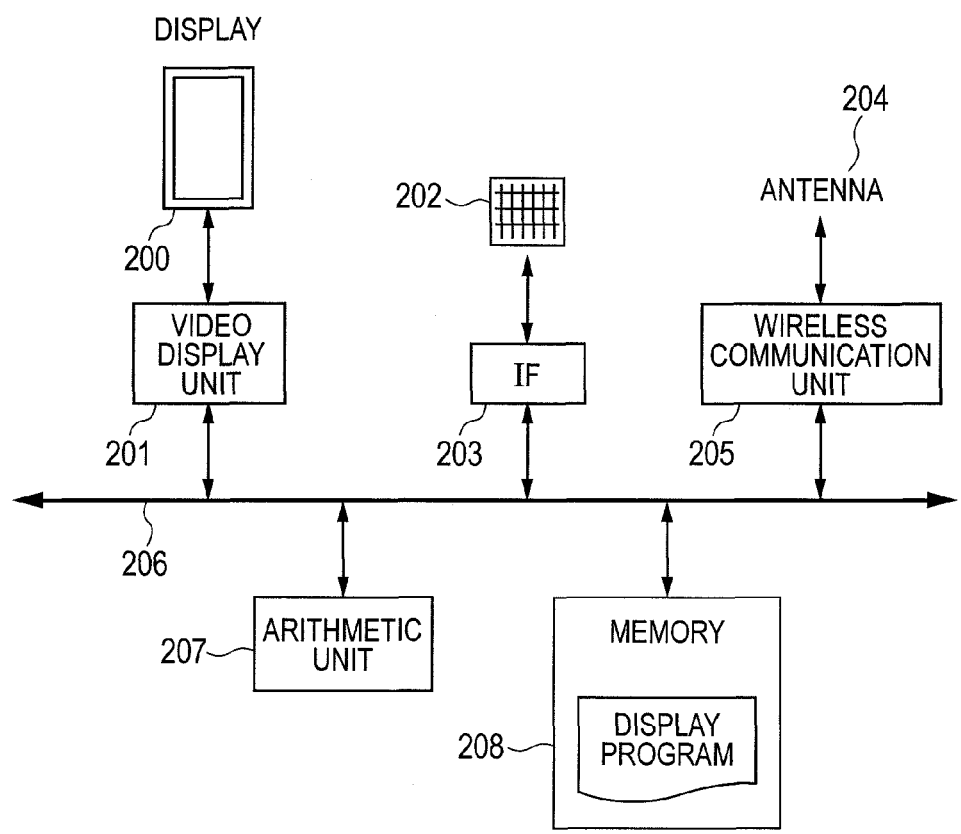
FIG. 2 is a diagram showing an example of a hardware configuration of a terminal in the recommendation system of FIG. 1.

FIG. 2 is a diagram showing an example of an internal configuration of the terminal 101 in FIG. 1. In FIG. 2, a display 200, an input device 202, and an antenna 204 are connected to an internal bus 206 such as a data bus via a video display unit 201, an interface (IF) 203, and a wireless communication unit 205, respectively. Also, in the same manner as in a normal computer, an arithmetic unit 207 including a central processing unit (CPU) and a memory 208 that is a storage unit are connected to the internal bus 206. The memory 208 stores a display program for generating data displayed on the display 200.

Figure 3:
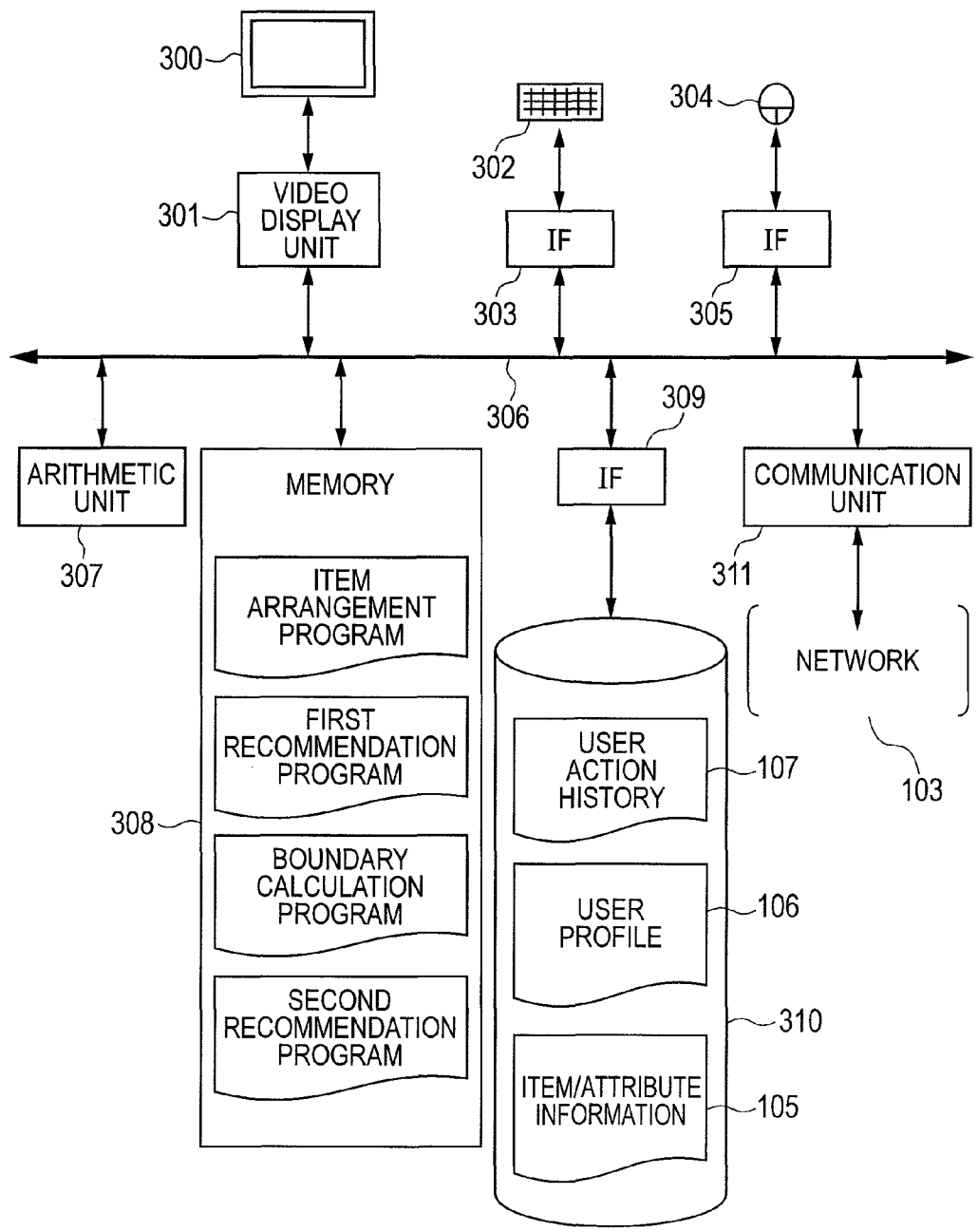
FIG. 3 is a diagram showing an example of a hardware configuration of a server in the recommendation system of FIG. 1.

Similarly, FIG. 3 is a diagram showing an example of an internal configuration of the server 104 in FIG. 1. In FIG. 3, reference numerals 300, 301, 302, 303, 304, 305, 306, 307, and 308 respectively denote a display device, a video display unit, an input device, an interface (IF), an input device, an interface (IF), an internal bus such as a data bus, an arithmetic unit including a CPU, and a memory. The server 104 is a normal computer. The recommendation program and the like in the memory will be described below in detail. In a storage device 310 connected to the internal bus 306 via an interface (IF) 309, the item/attribute information 105, the user profile 106, and the user action history 107, which are shown as databases in FIG. 1, are stored. The server is connected to the network 103 via a communication unit 311.

First Embodiment

The first embodiment is an example of a recommendation method and a recommendation system by item classification of vector space types. In the present embodiment, item similarity relationship is represented as spatial placement (vector) type, and a boundary area of interest and no interest is calculated to recommend an item. Specifically, all items are represented by vector according to the attribute thereof to generate a vector space, and a boundary of interest and no interest is determined in the vector space by using a first recommendation result. Then an item on the boundary or near the boundary is second recommended.

In the first embodiment, the server 104 having the system configuration shown in FIGS. 1 and 3 recommends various items such as contents to the terminal 101 held by the user 100 via the network, and further distributes the items to the terminal 101. In the present embodiment, all the items to be recommended/distributed are assumed to be an item vector, and various items are disposed in the vector space. The item vector is created by using the attribute of the item as a component.

For example, an item has three attributes which are category, price range, and purchasers. The category is represented by a numeral from 1 to 10, the price range is represented by a numeral from 1 to 5, and the purchasers are represented by a numeral from 1 to 5. Then, a set of three numerals is given to one item. For example, the category is 7, the price range is 3, and the "purchasers" is 5. At this time, the vector of the item is given by three components (7, 3, 5) (three dimension). Needless to say, this is the same when there are three or more components. The vector (7, 3, 5) may be represented by assuming that the vector is disposed at a corresponding position in a three-dimensional space. A method for performing data processing by assuming a string of numerals as a vector in this way is widely used in multivariate analysis and pattern recognition (for example, see Kenichiro Ishi, Naonori Ueda, Eisaku Maeda, Hiroshi Murase, "Easy-to-understand pattern recognition", Ohmsha, 1998). The components may be further normalized and used, or a publicly known conversion such as principal component analysis may be performed on the components.

Figure 4:
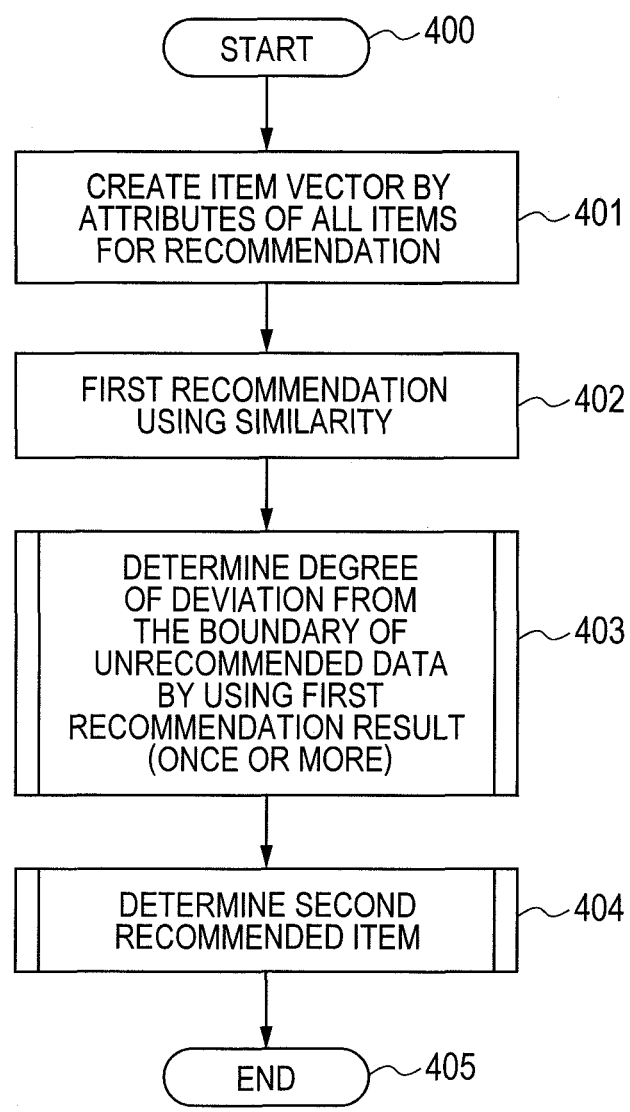
FIG. 4 is a diagram showing an entire flowchart of the recommendation system according to the first embodiment.

FIG. 4 is a diagram showing an entire flowchart in the server 104 of the recommendation system of the first embodiment. This flow is a processing flow in the arithmetic unit 307 which is the processing unit of the server 104. First, following the start (step 400, hereinafter "step" will be omitted), as described above, an item vector is created by attributes of all recommendation items (401). The degree of similarity is calculated for each item, and first recommendation using similarity is performed (402). Then, the result of the first recommendation (recommendation of once or more) is stored in the memory 308 and/or the storage device 310 which are storage units, and the degree of deviation from the boundary of unrecommended data is determined by using the stored data (403). Finally, a second recommended item is determined by using the degree of deviation from the boundary (404), and the process ends (405). In the first recommendation using the similarity, for example, conventional collaborative filtering may be used.

Figure 5:
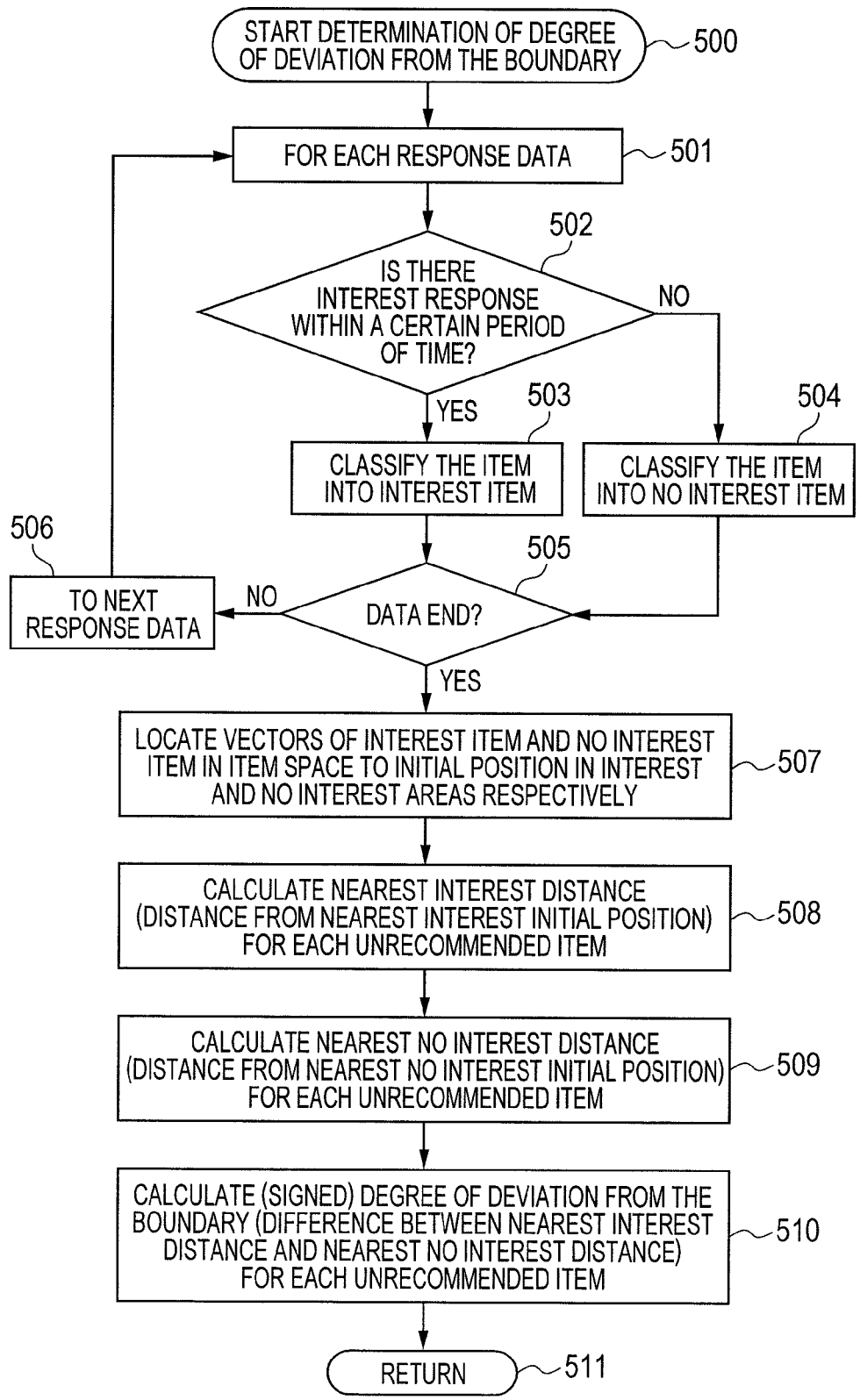
FIG. 5 is a diagram showing a flowchart for determining the degree of deviation from the boundary of data in the recommendation system according to the first embodiment.

Next, a detailed flow of the determination of the degree of deviation from the boundary (403) in FIG. 4 will be described with reference to FIG. 5. When the flow of the determination of the degree of deviation from the boundary is started (500), response data of each first recommended item (402) is checked (501), whether or not there is an interest response within a certain period of time is checked (502), if there is an interest response within the certain period, the item is classified into interest item (503), if there is no interest response, the item is classified into no interest item (504) and accumulated, and when all data is completed (505, 506), vectors of interest item and no interest item in the item space are located at initial positions in interest and no interest areas respectively (507).

Whether or not there is an interest response can be detected when the processing unit refers to log information that can be assumed to be a user's response to the first recommended item, such as whether or not there is an access to an access destination corresponding to the first recommended item, whether or not there is an electronic payment for a product related to the first recommended item, and a download of a discount coupon of a product corresponding to the first recommended item.

Next, a nearest interest distance (distance from a nearest interest initial position, that is, a distance from a vector of a nearest interest item) is calculated for each unrecommended item (508), similarly, a nearest no interest distance (distance from a nearest no interest initial position, that is, a distance from a vector of a nearest no interest item) is calculated for each unrecommended item (509), a signed degree of deviation from the boundary (difference between the nearest interest distance and the nearest no interest distance) is calculated for each unrecommended item (510), and the determination step of the degree of deviation from the boundary ends (511).

For example, Euclidean distance is used for the distance between item vectors. The definition of Euclidean distance is as follows: Euclidean distance $D(x, y)$ between a vector $x=(x1, x2, \ldots xd)$ and a vector $y=(y1, y2 \ldots yd)$ is $$D(x,y)=\sqrt{\{(y1-x1)^2+(y2-x2)^2+\ldots(yd-xd)^2\}}$$

Here, $\sqrt{\{\ \}}$ represents square root in { }, and $^2$ represents square.

By using Euclidean distance D calculated as described above, a nearest interest data initial position is selected for each unrecommended item and the distance from the nearest interest data initial position is defined as the nearest interest distance as described above. On the other hand, a nearest no interest data initial position is selected and the distance from the nearest no interest data initial position is defined as the nearest no interest distance. Then, the difference between both distances is calculated to obtain the signed degree of deviation from the boundary. For convenience, the sign is a sign of (nearest no interest distance−nearest interest distance). When the difference between the interest distance and the no interest distance is calculated, different weights may be added to the interest distance and the no interest distance respectively. When a larger weight is added to the interest distance, the boundary is set nearer to no interest.

Figure 6:
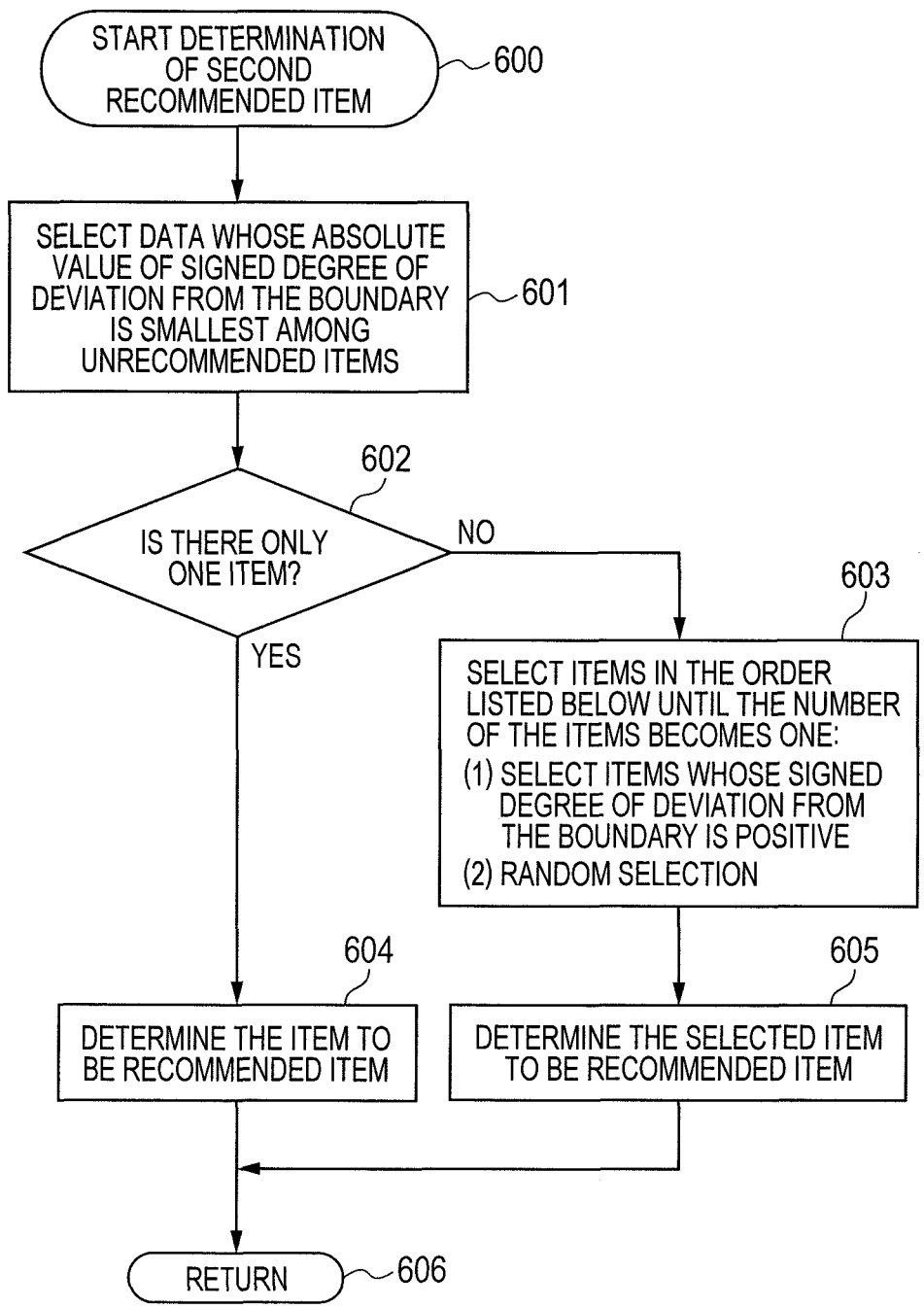
FIG. 6 is a diagram showing a flowchart for determining a second recommended item according to the first embodiment.

Next, the details of the determination of the second recommended item (404) in the flow of FIG. 4 will be described. FIG. 6 is a flow showing the details of the determination step of the second recommended item. When the flow starts (600), data whose absolute value of the signed degree of deviation from the boundary is the smallest among the unrecommended items is selected (601). Whether there is only one item or not is determined (602), and if there are plural of items, selection is performed in the order listed below until the number of the items becomes one (603): Only items whose signed degree of deviation from the boundary are positive are selected. (nearest no interest distance)−(nearest interest distance)>0

If the number of the items does not become one, random selection is performed, and the selection result is determined to be the recommended item (605).

In the number of the items are one in step 602, the item is determined to be the second recommended item (604), and the process ends (606).

Figures 7, 8:
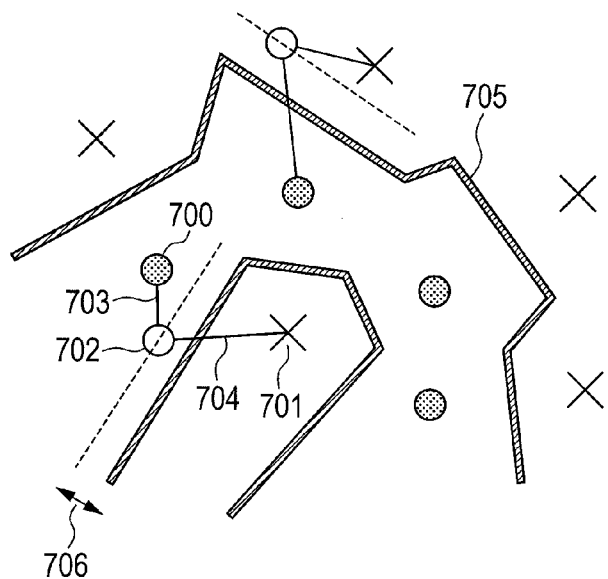
FIG. 7 is a diagram for explaining an item vector and a boundary of interest and no interest according to the first embodiment.
FIG. 8 is a diagram showing an example of an item/attribute data table according to the first embodiment.

FIG. 7 is a diagram for schematically showing an example of the relationship between an item vector and the boundary of interest and no interest in the present embodiment. In FIG. 7, reference numerals 700 (• mark), 701 (x mark), and 702 (○ mark) respectively denote an interest item, a no interest item, and an unrecommended item in the vector space. Reference numerals 703 and 704 respectively denote the nearest interest distance between the interest item 700 and the unrecommended item 702 and the nearest no interest distance. Reference numerals 705 and 706 respectively denote the boundary of interest and no interest and the signed degree of deviation from the boundary. Although, an explicit example of the calculation of the boundary of interest and no interest is not shown here, the calculation is defined so that the difference between "nearest interest distance" and "nearest no interest distance" is zero. Although a signed degree of deviation from the boundary 706 is schematically illustrated in FIG. 7, the signed degree of deviation from the boundary 706 can be calculated as described above.

FIG. 8 is a diagram showing an example of item/attribute data used in the present embodiment. This data is stored in the storage unit as the item/attribute information 105 in FIG. 1. In table 800, rows indicate items and columns indicate attributes. As the attributes, category, price range, and purchasers described above as well as season and the like are illustrated. As shown in the rightmost column, whether an item is related to a distinctive keyword or not can be used as an attribute.

Figures 9, 10:
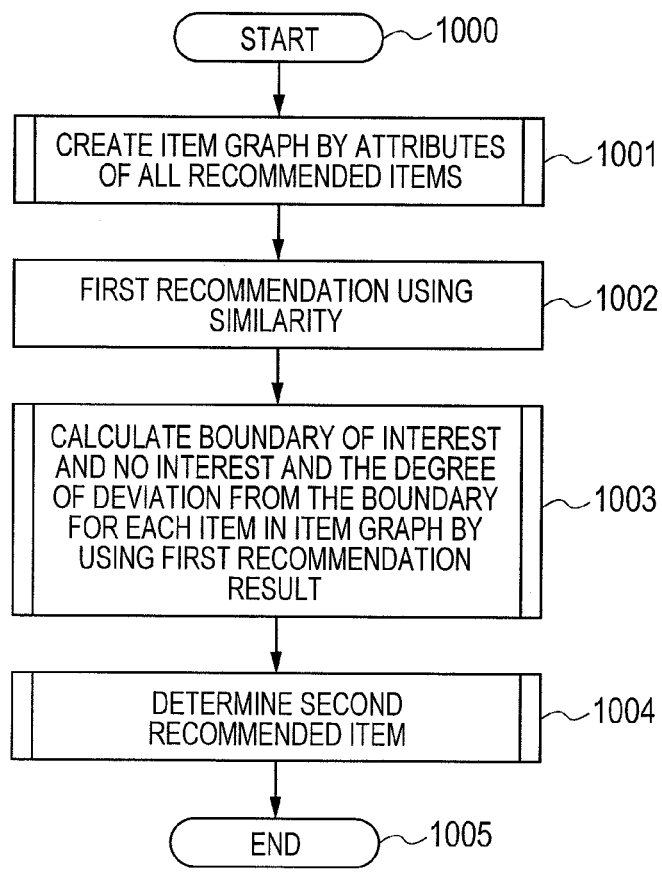
FIG. 9 is a diagram showing an example of a recommendation history data table according to the first embodiment.
FIG. 10 is a diagram showing an entire flowchart of a recommendation system according to a second embodiment.

FIG. 9 is a diagram showing an example of item recommendation history data in the present embodiment. Rows of a table 900 indicate recommended items, and columns indicates time when the item is recommended, content of the recommended item, and the like. As background information, time, site, and state of user can be used as a reference when an item is recommended. The rightmost column indicates a user's response to a recommended item. "1" indicates presence of response, "0" indicates absence of response, and they are used as a result of the first recommendation. The table 900 is stored in the storage unit as the user action history 107 in FIG. 1.

According to the first embodiment described above, the item similarity relationship is represented as spatial placement type of vectors, the boundary area of interest and no interest is calculated in the vector space, and an item on the boundary or near the boundary is selected. Thereby an unexpected item which a user is interested in but not easy to conceive can be recommended. In particular, when the boundary of interest and no interest is sufficiently far from the interest item, the probability that an unexpected information item is selected increases.

If only data nearest to the interest item is used, a large variation of evaluation value occurs near the boundary of interest and no interest. However, according to the present embodiment, by using the degree of deviation from the boundary, in an area near the boundary, items can be recommended sequentially from the area near the boundary in a continuous evaluation.

Second Embodiment

Next, a second embodiment will be described with reference to the drawings. The second embodiment is an embodiment in which an item on the boundary of interest and no interest and the degree of deviation from the boundary of each item are calculated in an item graph by using a graph configuration type, that is, the first recommendation result, instead of the vector space placement type of the first embodiment. In the present embodiment, by using the response item and the no response item, which are results of the first recommendation, as start points, links on the item graph are respectively traced and extended, and items (generally plural items) on an area where both areas overlap are defined as the boundary.

FIG. 10 is a diagram showing an entire flowchart of the second embodiment. Needless to say, this flow is also performed by the server 104 having the system configuration shown in FIGS. 1 and 3 in the same manner as in the first embodiment. In FIG. 10, when the processing flow is started (1000), the item graph is created by attributes of all recommended items (1001). Then, the first recommendation using the similarity is performed (1002). Then, the boundary of interest and no interest and the degree of deviation from the boundary for each item are calculated in the item graph by using first recommendation result (1003), and the second recommended item is determined based on the result of step 1003 (1004). Then the process ends (1005).

FIG. 11A is a flow showing the details of the creation of the item graph in FIG. 10 (1001). When the creation of the item graph is started (1100), the similarity of a pair (i, j) (here, j>i) is calculated for each item i (i=0, 1, 2, ... N) (1101), whether the similarity is greater than a threshold value or not is determined (1102), if the result is YES, it is determined that there is a link between i and j (1103), if the result is NO, it is determined that there is no link between i and j (1104), and the process ends (1105).

Here, as the similarity between items, for example, normalized correlation between attribute vectors is used. When the attribute vector of an item i, j is x=(x1, x2, ... xd), a vector y=(y1, y2 ... yd), and the normalized correlation is Cor(x, y), the definition of the similarity is as follows:

$$Cor(x,y)=(y1 \cdot x1+y2 \cdot x2+ \ldots +yd \cdot xd)/[\sqrt{\{(x1)^2+(x2)^2+ \ldots (xd)^2\}} \cdot \sqrt{\{(y1)^2+(y2)^2+ \ldots (yd)^2\}}]$$

Here, in the same manner as described above, $\sqrt{\{\ \}}$ represents square root in { }, ^2 represents square, · represents multiplication, and / represents division. In step 1103, for example, a portion where the similarity is greater than or equal to a predetermined threshold value (for example, 0.5) is determined to be linked.

Figure 11C:
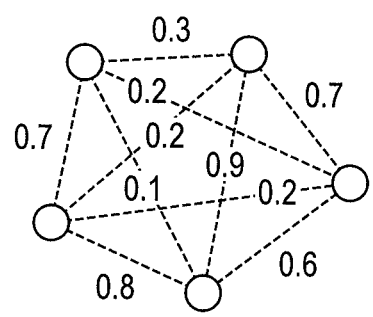
FIG. 11C is a schematic diagram for explaining the flow of creating a graph of items according to the second embodiment.
Figure 11D:
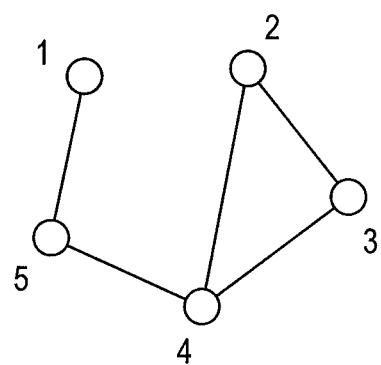
FIG. 11D is a schematic diagram for explaining the flow of creating a graph of items according to the second embodiment.

FIGS. 11B to 11D schematically show the above-described processing of the present embodiment. In FIG. 11B, reference numerals 1 to 5 denote item i. FIG. 11C shows normalized correlation values 0.1 to 0.9, which are similarities between items 1 to 5. FIG. 11D shows links having a value greater than or equal to the above-described threshold value (0.5).

Figure 12:
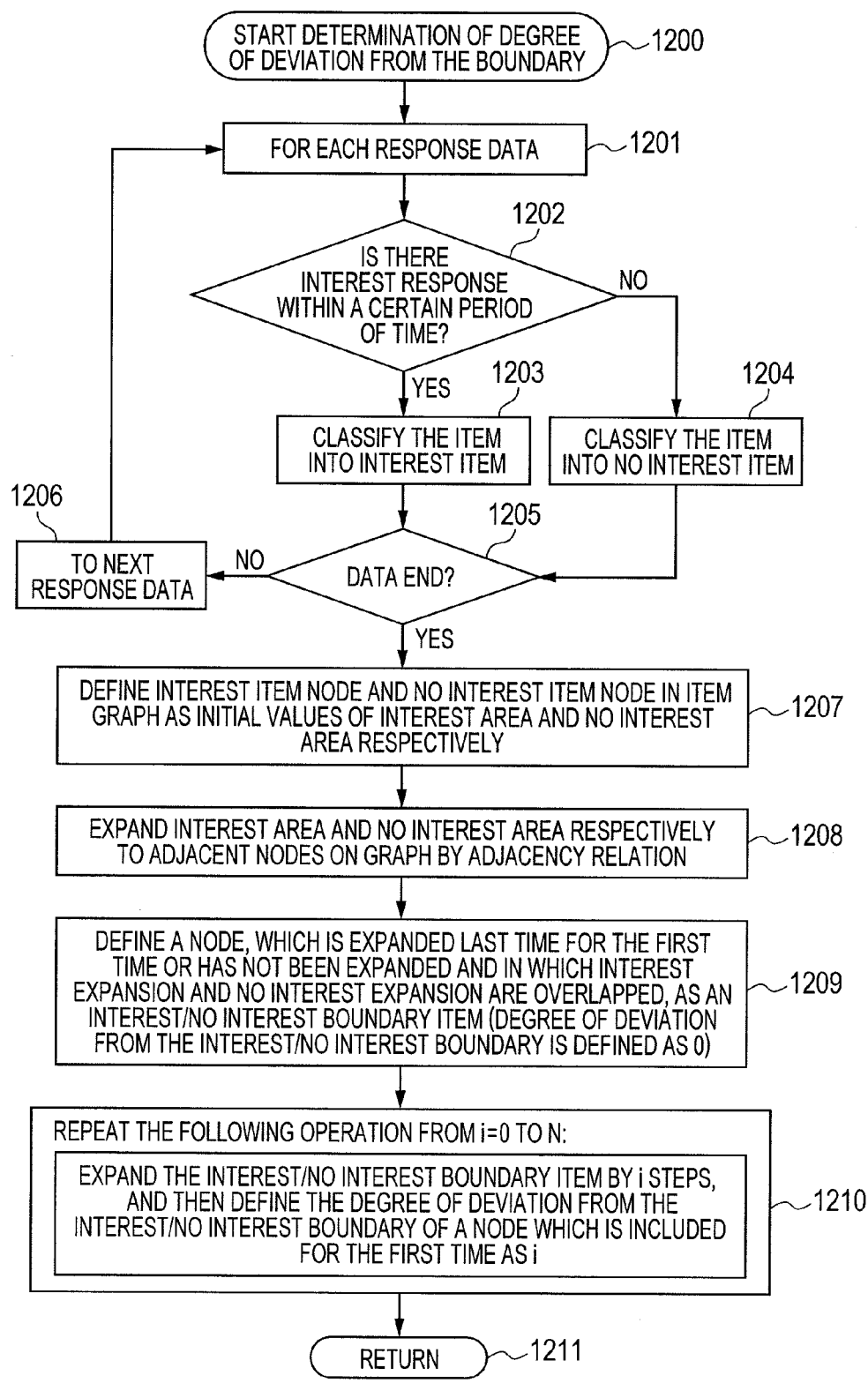
FIG. 12 is a diagram showing a flowchart for determining an item on the boundary of interest and no interest and the degree of deviation from the boundary according to the second embodiment.

Next, the details of step 1003, which is the calculation of the degree of deviation from the boundary in FIG. 10, will be described with reference to FIG. 12. In FIG. 12, when the calculation/determination flow of the degree of deviation from the boundary is started (1200), response data is checked for each data to which the user responds (1201). First, whether or not there is an interest response within a certain period of time is checked for each data (1202), if the result is YES, the item is classified into interest item (1203), and if the result is NO, the item is classified into no interest item (1204). Whether or not all data have been processed is checked (1205), and if the result is NO, the next response data is checked (1206).

If all data has been processed, an interest item node and a no interest item node in the item graph are respectively defined as initial values of interest area and no interest area (1207). Then the interest area and the no interest area are respectively expanded to adjacent nodes on the graph by adjacency relation (1208). Hereinafter, one expansion operation to the adjacent node is referred to as an (one) expansion step. When the expansion step is repeatedly performed, a node, which is expanded for the first time in the previous expansion step or had not been expanded until the previous expansion step, and in which expansion from interest side overlaps expansion from no interest side, is defined as an interest/no interest boundary item, that is, an item at which the degree of deviation from the interest/no interest boundary is 0 (1209).

Finally, expansion is performed by using the interest/no interest boundary item determined by the above operation as an initial node, and the degree of deviation from the interest/no interest boundary of a node which is included for the first time after i steps of expansion is defined as i. The above operation is repeated from i=1 to N (1210), and then the process ends (1211).

Figure 13A:
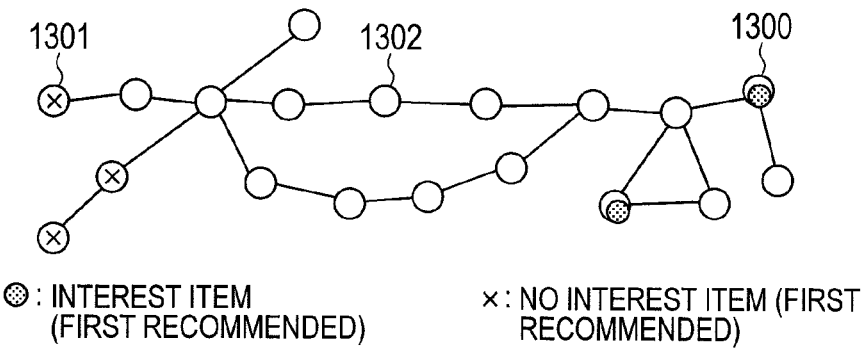
FIG. 13A is a schematic diagram for explaining determination of the item on the boundary of interest and no interest and the degree of deviation from the boundary according to the second embodiment.

FIGS. 13A to 13D schematically show a specific example of step 1207 to step 1210. Fist, as shown in FIG. 13A, an interest item node and a no interest item node are respectively defined as initial values of interest area and no interest area. In the same manner as in FIG. 7, • mark, x mark, and ○ mark in items respectively indicate a first recommended interest item 130, a no interest item 1301, and an unrecommended item 1302.

Figure 13B:
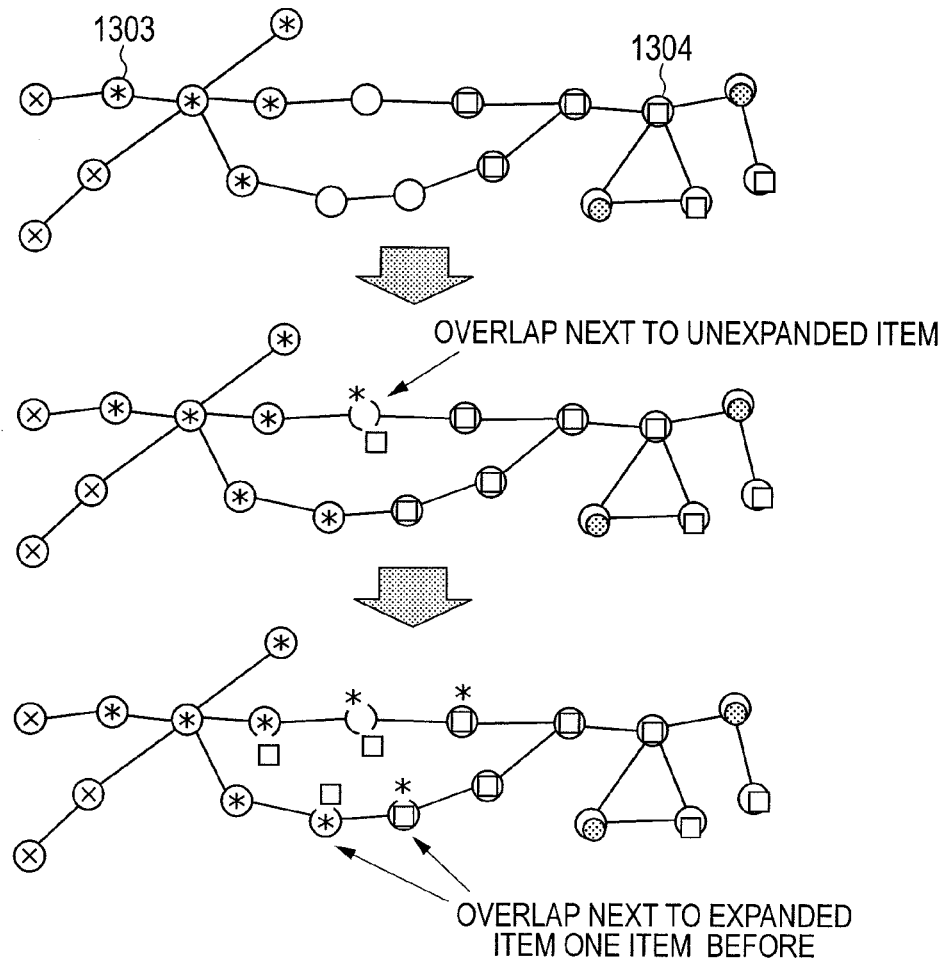
FIG. 13B is a schematic diagram for explaining determination of the item on the boundary of interest and no interest and the degree of deviation from the boundary according to the second embodiment.
Figure 13C:
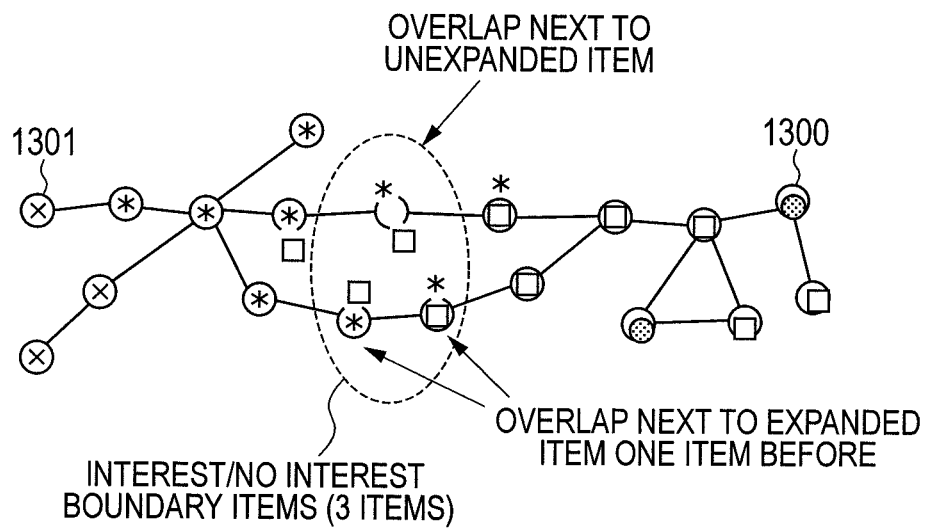
FIG. 13C is a schematic diagram for explaining determination of the item on the boundary of interest and no interest and the degree of deviation from the boundary according to the second embodiment.

Next, as shown in FIG. 13B, the interest area and the no interest area are respectively expanded to adjacent nodes on the graph by adjacency relation. The upper, middle, and lower portions of FIG. 13B respectively show a state after three expansions, a state after four expansions, and a state after five expansions. In the middle portion of FIG. 13B, nodes indicating * mark and □ mark respectively represent items 1303 and 1304 which are respectively expanded from a no interest item and an interest item. Then, as shown in FIG. 13C, a node, which is expanded for the first time in the previous expansion or has not been expanded, and in which interest expansion and no interest expansion are overlapped, is defined as an interest/no interest boundary item. Specifically, three items surrounded by a dotted line are the interest/no interest boundary items and the degree of deviation from the interest/no interest boundary of the three items is 0.

Figure 13D:
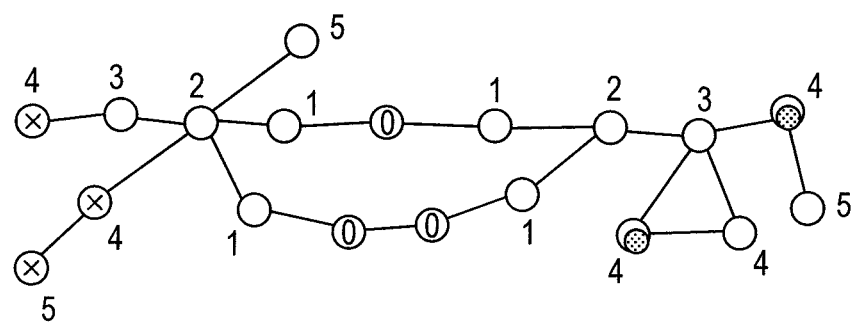
FIG. 13D is a schematic diagram for explaining determination of the item on the boundary of interest and no interest and the degree of deviation from the boundary according to the second embodiment.

In FIG. 13D, values other than 0, which is the degree of deviation, indicate the degree of deviation i from the interest/no interest boundary of a node which is included for the first time after i steps of expansion are performed.

The value N, which determines a maximum degree of deviation, is a parameter given in advance. The number of expansion steps may be different between the interest area and the no interest area, and one may be greater than the other. As another method, in the same manner as in the first embodiment, the numbers of steps, in which nodes are traced and expanded from an unrecommended item and reach an interest item and a no interest item for the first time, are respectively defined as "nearest interest distance" and "nearest no interest distance", and the degree of deviation may be defined by using a difference between "nearest interest distance" and "nearest no interest distance".

Figure 14:
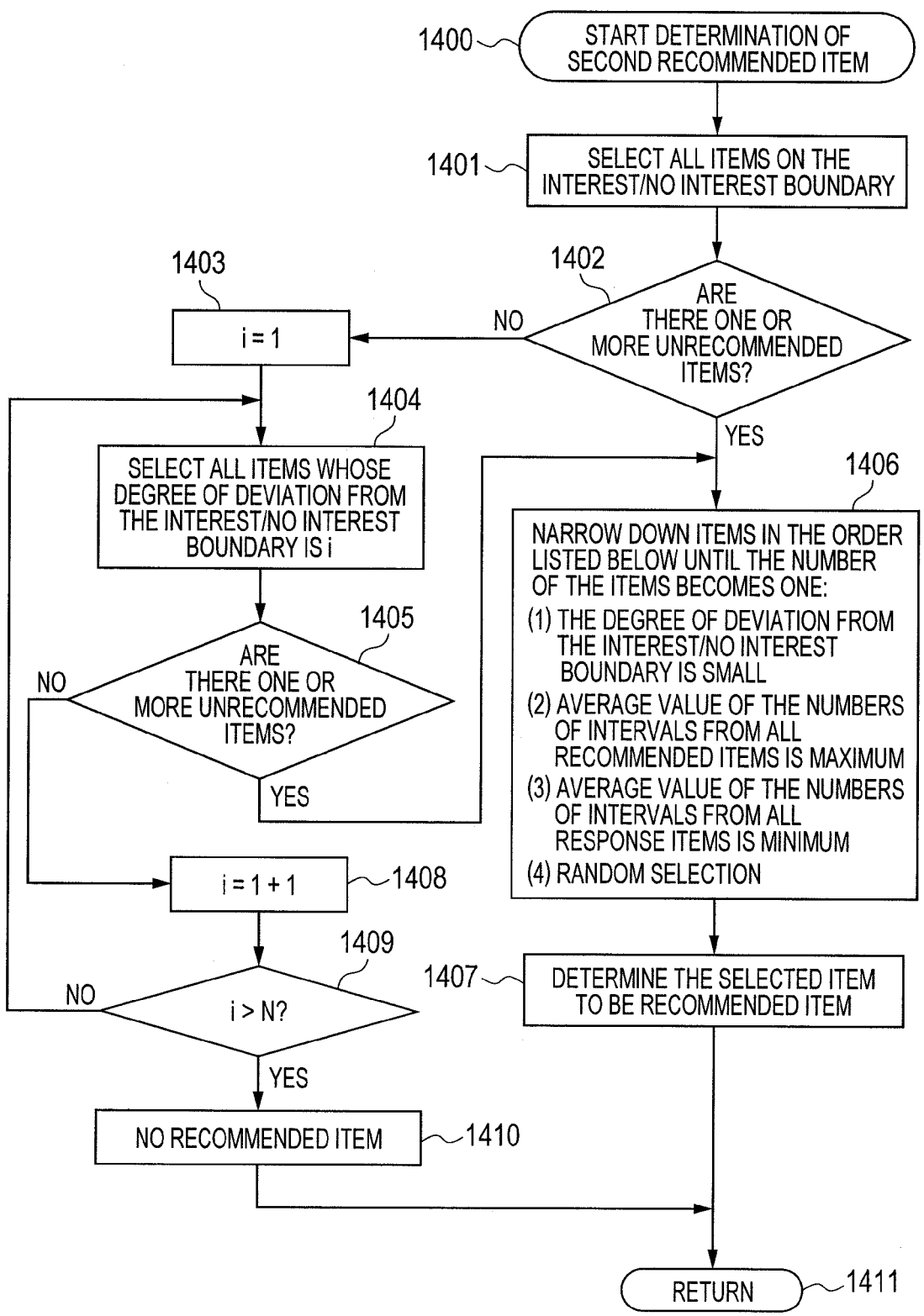
FIG. 14 is a diagram showing a flowchart for determining a second recommended item according to the second embodiment.

FIG. 14 is a diagram for explaining a modified example of the determination step 1005 of the second recommended item in FIG. 10 in the present embodiment. The item graph is the same as that in FIG. 13C.

In the modified example in FIG. 14, on the graph representation, an item near the boundary is preferentially recommended. When the flow is started (1400), all items on the interest/no interest boundary (for example, three items) are selected (1401). Then, whether or not there are one or more unrecommended items is checked (1402). If there is no unrecommended item, it is assumed that i=1 (1403), all item items whose degree of deviation from the interest/no interest boundary is i are selected (1404), and whether or not there one or more unrecommended items is checked (1405). If there is no unrecommended item, i is counted up (1408), the operation is repeated until i becomes N (1409), and if there is no unrecommended item (1410), the second recommended item determination processing ends (1411).

On the other hand, if there are one or more unrecommended items in step 1402 or step 1405, the following processing is repeatedly performed until the number of the items becomes 1 (1406).
(1) Select items whose degree of deviation from the interest/no interest boundary is small.
(2) Select items whose average value of the numbers of intervals from all recommended items is maximum.
(3) Select items whose average value of the numbers of intervals from all response items is maximum.
(4) Select an item by performing a random selection.
Then, the selection result is determined to be the recommended item (1407), and the process ends (1411).

Also in the present embodiment, in the same manner as in the variation of the second embodiment, the numbers of steps, in which nodes are traced and expanded from an unrecommended item and reach an interest item and a no interest item for the first time, are respectively defined as "nearest interest distance" and "nearest no interest distance", and the degree of deviation may be defined by using a difference between "nearest interest distance" and "nearest no interest distance".

As described above, if only nearest data is used, a large variation of evaluation value occurs near the boundary of interest and no interest. However, also in the present embodiment, in an area near the boundary, items can be recommended sequentially from the area near the boundary in a continuous evaluation.

Third Embodiment

Next, as a third embodiment, a recommendation system for performing recommendation by using "site context" data will be described. Here, the site context data is data whose base information is a physiological phenomena parameter, a human relations parameter, and a user profile. Specifically, the "physiological phenomena parameter" is a parameter related to human senses (desire to eat or take a rest, pain such as cold, hot, painful, and dark) and emotions (delight, anger, sadness, and happiness). For example, the "physiological phenomena parameter" means a previous meal time and an estimated calorie intake, a walking distance, and a type of service used lately (for example, genre or type of movie). The "human relations parameter" is a parameter related to human relations of a companion of the user. For example, the "human relations parameter" is lover, wife, husband, family, friend, and the like. This parameter is estimated from, for example, a communication state (a call frequency, a mail frequency, and a common community participation frequency). Whether or not the user is accompanied by a companion is determined by whether or not position information obtained by a GPS or the like mounted in an information terminal held by the user indicates that the user is near the companion for a certain period of time. As the "user profile", information such as sex, age, and the like registered in advance when the information terminal is registered as a subscriber can be used.

Figure 15:
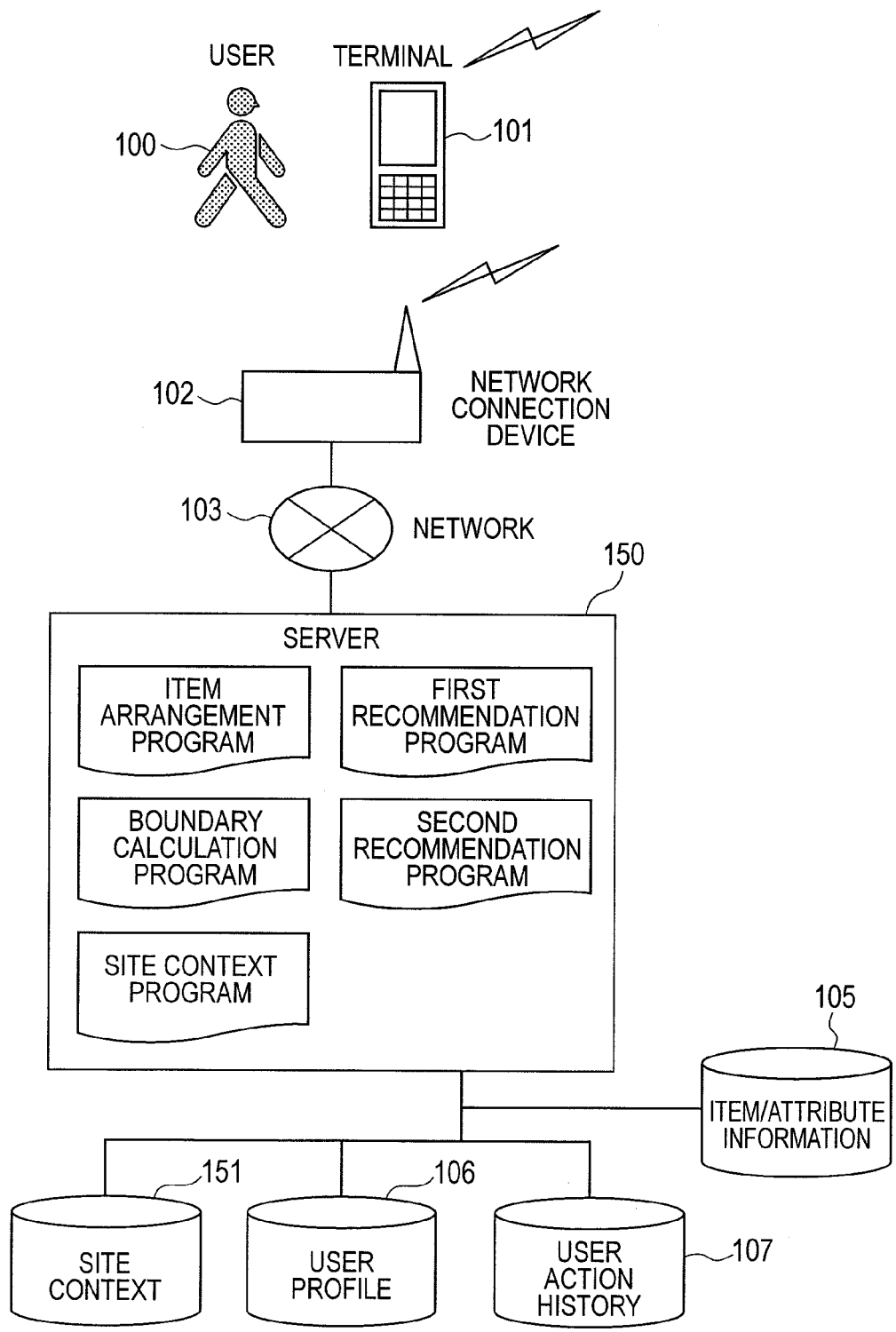
FIG. 15 is a diagram showing an example of an entire system configuration in which a recommendation system according to a third embodiment is implemented.

FIG. 15 shows an example of an entire system configuration in which a recommendation system according to the present embodiment is implemented, and components given the same reference numerals as those in the system of FIG. 1 indicate the same components as those in the system of FIG. 1. In the present system, the server 150 stores a site context application program inside the server 150, and a site context database 151, whose contents will be described below in detail, is added to the database in which various tables are stored. The other configuration is the same as that of the system described in FIGS. 1 to 3.

Figure 16:
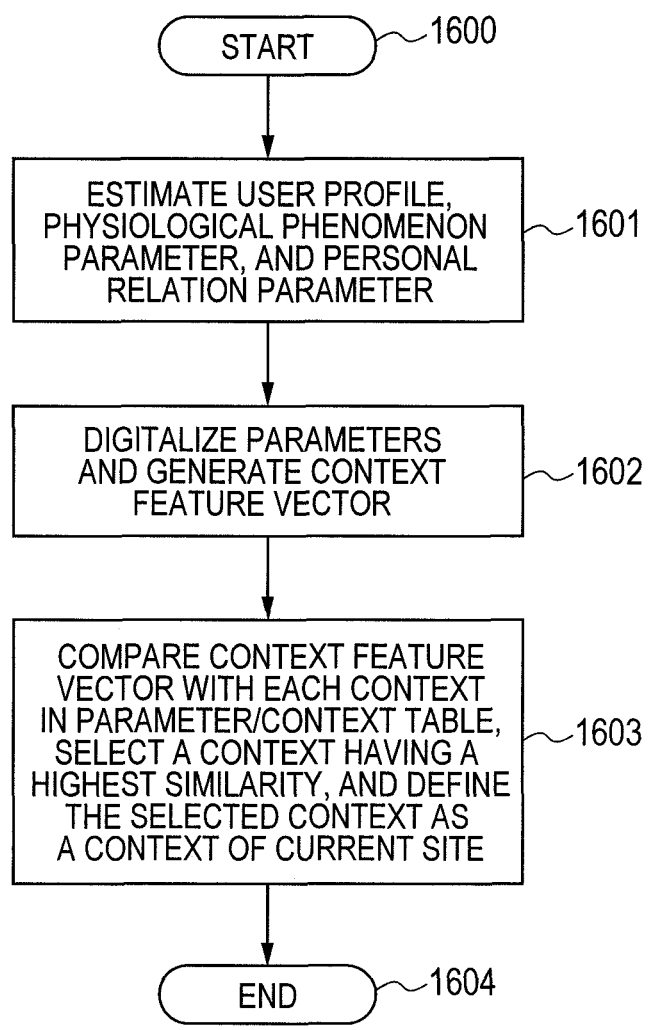
FIG. 16 is a diagram of a flowchart for explaining a determination sequence of a site context according to the third embodiment.

A procedure for determining a site context, which is added by the system of the present embodiment, will be described with reference to FIG. 16.

When the determination flow is started (1600), the server 150 estimates the user profile, the physiological phenomena parameter, and the human relations parameter described above (1601). When the estimation is performed, the profile is estimated by using information registered when the user registration is performed. The physiological phenomena parameter is estimated from a moving distance of the mobile terminal, states of various sensors, and a staying state in a facility, and the like. The states of various sensors are physiological measured values such as blood glucose level, body temperature, heartbeat, and breathing rate. The human relations parameter is estimated from a communication state (communication speed, mail frequency, and common community participation frequency). For example, a common sense rule such as "he or she has a good relationship with a person whom he or she calls often in a private time." is applied to estimate the human relations parameter.

Then, the parameters obtained by estimation are digitalized by using predetermined correspondence relationships, and a context feature vector is generated (1602). When digitalizing the parameters, for example, a parameter digitalization information table 1800 shown in FIG. 18A is used. Thereby, each item can be digitalized, such as, thirties is "(0, 0, 1, 0, 0, 0)" and male is "(1, 0)" in the user profile, a walking distance of 10 km is "10" in the physiological phenomena parameter, and wife is "(1, 0, 0)" in the human relations parameter. The generation method of a vector is the same as that described above using the definition thereof. When linking and arranging vectors in a predetermined order, one vector is generated. This vector is called a context feature vector. FIG. 18B shows a parameter table 1801 of contexts A to Z. For ease of understanding, values that have not been digitalized are shown in the parameter table 1801; needless to say, however, corresponding digitalized values are actually stored in the table.

Finally, the generated context feature vector is compared with each context in the context/parameter table in the site context database 151 in the degree of similarity, and a context having a highest similarity is selected and estimated as the context of the current site (1603), and then the flow ends (1604). As the degree of similarity, the normalized correlation or the like is used in the same manner as in the case of the item vector.

Figure 17:
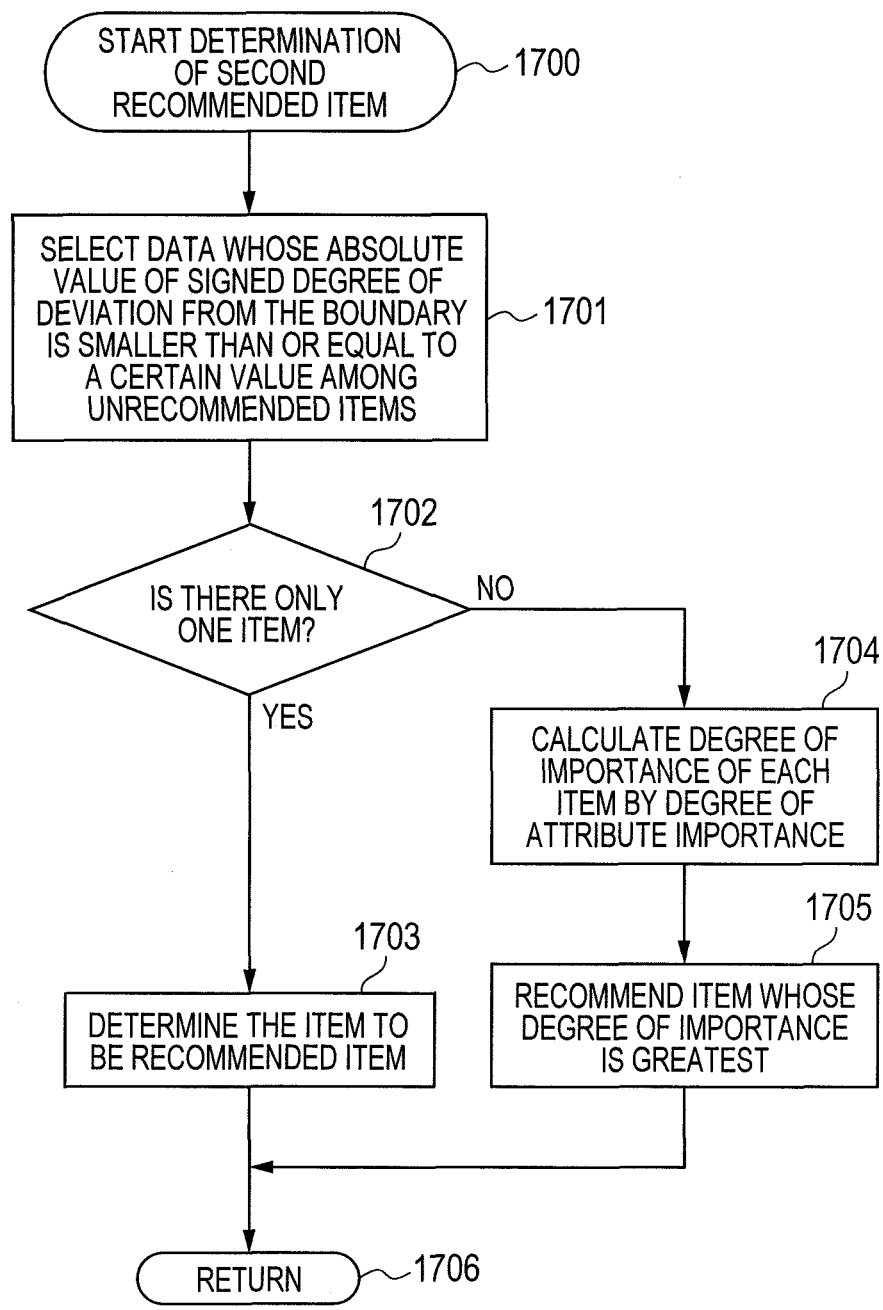
FIG. 17 is a diagram showing a flowchart for determining a second recommended item according to the third embodiment.

Next, the determination processing of the second recommended item in the present embodiment using the site context will be described with reference to FIG. 17. When the determination flow is started (1700), in the same manner as in the first embodiment, data whose absolute value of the signed degree of deviation from the boundary is smaller than or equal to a certain value among the unrecommended items are selected (1701). Whether or not there is only one item is determined (1702), and if there is only one item, the item is determined to be the recommended item.

If the number of the items is not one, the degree of importance of each item is calculated by using weight corresponding to the determined cite context (the degree of attribute importance) (1704). The weight corresponding to the site context (the degree of attribute importance) is stored in a context/attribute table in advance. FIG. 18C shows an example of an attribute weight table 1802 that stores context/attribute weight. The calculation of the importance of each item in step 1704 is described below. The weights corresponding to the site context estimated in advance correspond to weights in one of the rows in FIG. 18c.

By the context/attribute weight table, the weights of the current context are assumed to be as follows:
Weights of the first attribute . . . (w11, w12, . . . , w1{n1})
Weights of the second attribute . . . (w21, w22, . . . , w2{n2})
. . .
Weights of the dth attribute . . . (wd1, wd2, . . . , wd{nd})

Here, w has two suffixes. The left suffix indicates the serial number of the attribute, and the right suffix indicates a number added to each value that can be given to the attribute. Therefore, for example, the suffix {n1} indicates the total number of values that can be given to the first attribute. {n2}, {n3}, and so on indicate the same. When numbers of values of d attributes of an item x are (x1, x2, . . . , xd), the degree of importance is calculated as follows:

$$\text{(The degree of importance of item)} = \Sigma\_j \in \{n1\}\delta(x1, j)w1j +$$
$$\Sigma\_j \in \{n2\}\delta(x2, j)w2j + \ldots +$$
$$\Sigma\_j \in \{nd\}\delta(xd, j)wdj$$
$$= \Sigma\_i \Sigma\_j \in \{ni\}\delta(xi, j)wij$$

Here, $\delta(x1, j)=1$ when $x1=j$, and $\delta(x1, j)=0$ when $x1 \neq j$. In $\Sigma\_i$, a sum is calculated so that i changes over the numbers 1 to d of the attribute. $\Sigma\_j \in \{n\}$ indicates that a sum is calculated so that j changes over the numbers 1 to {ni} of the values that can be given to the ith attribute.

The above formula calculates "a sum of the degrees of attribute importance of each attribute of the item". Thereby the degree of importance of each item is calculated (1704), so an item whose degree of importance is greatest can be recommended (1705), and then the flow ends (1706).

According to the present embodiment, it is possible to recommend an item from all recommended items near the boundary by reflecting priority weights by the site context, so a background state occurring related to user action can be reflected into contents of the recommendation.

INDUSTRIAL APPLICABILITY

It is possible to provide an information recommendation method and system capable of recommending an unexpected item which a user is interested in but not easy to conceive. The method and system are effective in information distribution using a network.

REFERENCE SIGNS LIST

100 . . . user
101 . . . terminal
102 . . . network connection device
103 . . . network 104 . . . server
105 . . . item/attribute information
106 . . . user profile
107 . . . user action history
206 . . . internal bus
207 . . . arithmetic unit
306 . . . internal bus
308 . . . memory
309 . . . interface
310 . . . storage device
311 . . . communication unit
700 . . . interest item
701 . . . no interest item
702 . . . unrecommended item
702 . . . nearest interest distance
704 . . . nearest no interest distance
705 . . . boundary of interest and no interest
706 . . . degree of deviation from the boundary

The invention claimed is:

1. An information recommendation method which uses a server including a processing unit and a storage unit, reflects a response of a user receiving information related to an item in a selection criterion of an item to be recommended next time, and recommends another item, the information recommendation method comprising operations wherein:

the processing unit collects information to which the user reacts and information to which the user does not react, compares the degree of similarity between an unrecommended item and an interest item to which the user reacts with the degree of similarity between the unrecommended item and a no interest item to which the user does not react, and determines the next recommended item to the user by using the comparison result;

the processing unit estimates a boundary of interest and no interest, which is a boundary between the interest items and the no interest items, in all items to be recommended, by expanding unrecommended items similar to the interest item and the no interest item respectively from the interest item and the no interest item; and the processing unit determines the unrecommended item on the boundary of interest and no interest or near the boundary of interest and no interest or the interest item determined by the boundary of interest and no interest, as the next recommended item.

2. An information recommendation system using a server which is connected to a terminal via a network and which reflects a response of a user receiving information related to a first recommended item in a selection criterion of a second recommended item and recommends another item, the information recommendation system wherein:

the server includes a processing unit and a storage unit, and the processing unit is configured to: collect information to which the user reacts and information to which the user does not react with respect to the first recommended item, compare the degree of similarity between an unrecommended item and an interest item to which the user reacts with the degree of similarity between the unrecommended item and a no interest item to which the user does not react, and determine a second recommended item to the user by using the comparison result;

the processing unit is configured to: determine a boundary of interest and no interest, which is a boundary between the interest items and the no interest items, in all items to be recommended, by expanding unrecommended items similar to the interest item and the no interest item respectively from the interest item and the no interest item; and the processing unit is configured to: determine the unrecommended item on the boundary of interest and no interest or near the boundary of interest and no interest or the unrecommended item on the interest area side determined by the boundary of interest and no interest, as the second recommended item.

3. A server which reflects a response of a user receiving information related to a first recommended item in a selection criterion of a second recommended item and recommends a second recommended item, the server comprising:

a processing unit; and a storage unit, wherein the processing unit is configured to: accumulate information to which the user reacts and information to which the user does not react in the storage unit, compare the degree of similarity between an unrecommended item and an interest item to which the user reacts with the degree of similarity between the unrecommended item and a no interest item to which the user does not react, and determine a second recommended item to the user by using the comparison result;

the processing unit is configured to: estimate a boundary of interest and no interest, which is a boundary between the interest items and the no interest items, in all items to be recommended, by expanding unrecommended items similar to the interest item and the no interest item respectively from the interest item and the no interest item; and the processing unit is configured to: determine the unrecommended item on the boundary of interest and no interest or near the boundary of interest and no interest or the unrecommended item on the interest area determined by the boundary of interest and no interest, as the second recommended item.

* * * * *